United States Patent
Zhou et al.

(10) Patent No.: US 8,804,315 B2
(45) Date of Patent: Aug. 12, 2014

(54) CABLE POSITIONING MECHANISM AND ELECTRONIC DEVICE USING SAME

(75) Inventors: Xiao-Hui Zhou, Shenzhen (CN); Wei Liu, Shenzhen (CN); Yuan-Ming Wang, Shenzhen (CN); Rui Li, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 86 days.

(21) Appl. No.: 13/517,680

(22) Filed: Jun. 14, 2012

(65) Prior Publication Data

US 2013/0141848 A1 Jun. 6, 2013

(30) Foreign Application Priority Data

Dec. 5, 2011 (CN) .......................... 2011 1 0398389

(51) Int. Cl.
*H02G 3/02* (2006.01)
*H05K 7/00* (2006.01)

(52) U.S. Cl.
USPC ................ 361/679.01; 248/65; 174/68.1

(58) Field of Classification Search
USPC ............. 361/367.01, 679.02, 679.03, 679.57, 361/679.58, 724, 728, 730, 742, 752, 760, 361/796; 312/223.1, 223.2; 439/371, 470, 439/449, 171; 174/68.1, 68.3, 72 A, 74 R, 174/21 R, 24, 100

See application file for complete search history.

(56) References Cited

U.S. PATENT DOCUMENTS

| | | | | |
|---|---|---|---|---|
| 8,025,520 | B1* | 9/2011 | Li et al. | 439/371 |
| 2005/0115735 | A1* | 6/2005 | Iwai | 174/68.1 |
| 2007/0155236 | A1* | 7/2007 | Shi et al. | 439/587 |
| 2012/0162869 | A1* | 6/2012 | Li et al. | 361/679.01 |

* cited by examiner

*Primary Examiner* — Robert J Hoffberg
*Assistant Examiner* — Michael Matey
(74) *Attorney, Agent, or Firm* — Novak Druce Connolly Bove + Quigg LLP

(57) ABSTRACT

A cable positioning mechanism includes a main body and first and second positioning members arranged on the main body. The first positioning member includes a first surface and a second surface connecting with the first surface. The second positioning member includes a first end parallel to the second surface and a second end parallel to the first surface. The second end cooperates with the second surface to define a first holding space for allowing a cable being placed thereinto. The first end cooperates with the first surface to define a second holding space communicating with the first holding space. The second positioning member further includes a hook. The hook extends into the second holding space and clamps the cable to the main body when the cable is rotated to be received in the second holding space. An electronic device using the cable positioning mechanism is also provided.

8 Claims, 5 Drawing Sheets

CABLE POSITIONING MECHANISM AND ELECTRONIC DEVICE USING SAME

BACKGROUND

1. Technical Field

The present disclosure relates to a cable positioning mechanism and an electronic device using the cable positioning mechanism.

2. Description of Related Art

Electronic devices include a plurality of cables for electrically connecting different electronic components. However, most of the time, the cables in the electronic device are arranged disorderly and unsystematically.

Therefore, there is room for improvement in the art.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the three views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
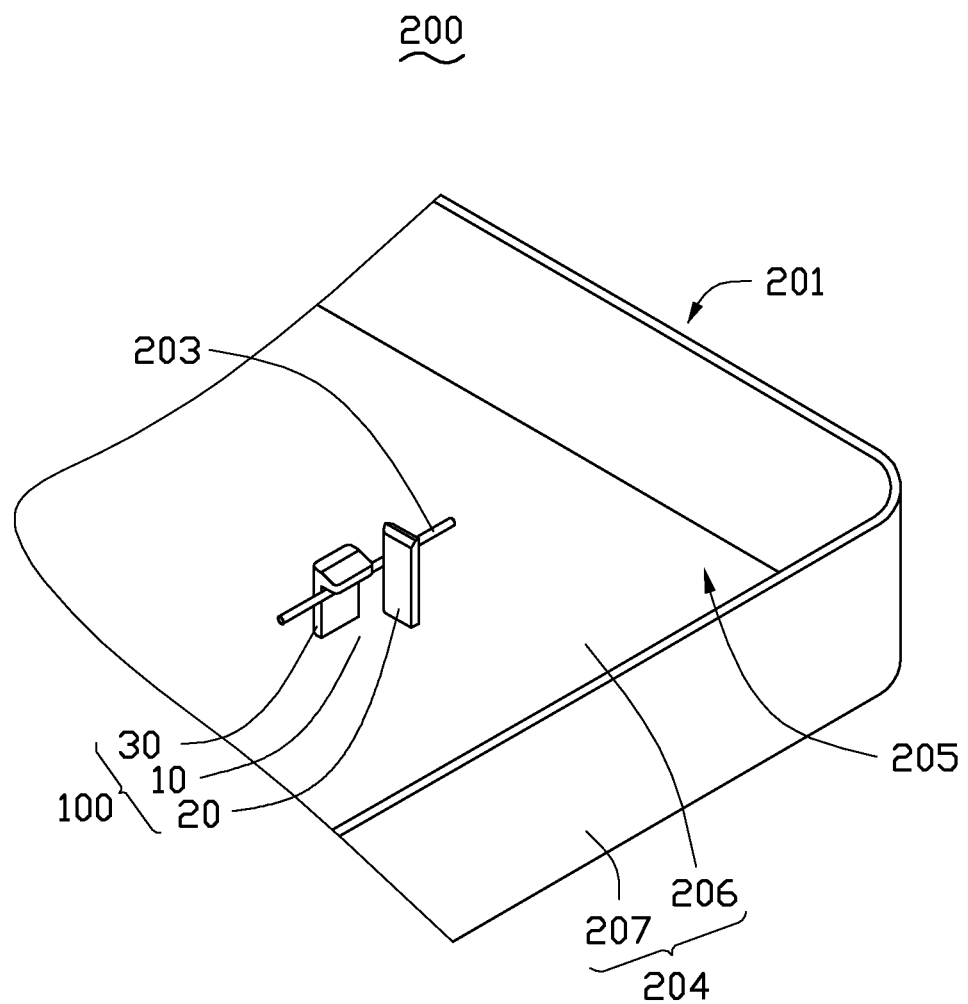
FIG. 1 is a partial perspective view of an electronic device in accordance with an exemplary embodiment; the electronic device includes a cable positioning mechanism.
Figure 2:
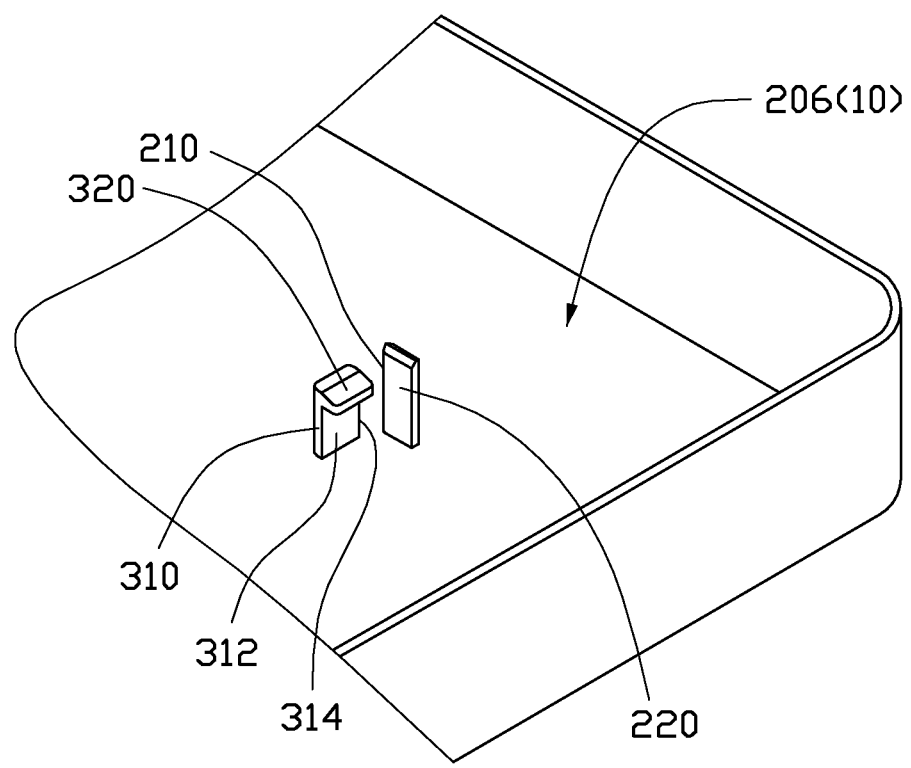
FIG. 2 is a perspective view of the cable positioning mechanism of the electronic device of FIG. 1.
Figure 3:
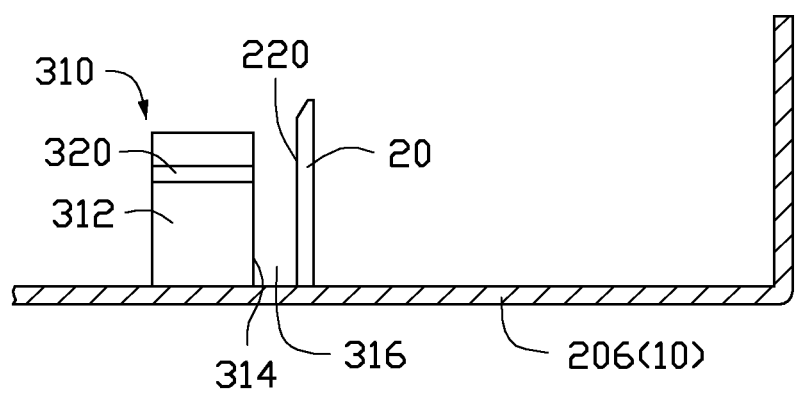
FIG. 3 is a perspective view showing the cable positioning mechanism of FIG. 2 in a first direction.

Referring to FIGS. 1-3, an electronic device 200 in accordance with an embodiment is shown. The electronic device 200 includes a housing 201, a cable positioning mechanism 100 accommodated in the housing 201, and a cable 203 received in the housing 201. The electronic device 200 is a portable DVD player in the embodiment. The cable 203 is substantially circular, and can be wires electrically connecting electronic components (not shown) of the electronic device 100.

The housing 201 includes a bottom case 204 and a top case (not shown) engaging with the bottom case 204. The bottom case 204 and the top case cooperatively define a receiving space 205 for receiving the cable positioning mechanism 100, the cable 203 and other components of the electronic device 200, such as, circuit board. The bottom case 204 includes a bottom wall 206 and a plurality of sidewalls 207 perpendicularly extending from rims of the bottom wall 206.

The cable positioning mechanism 100 includes a main body 10, a first positioning member 20, and a second positioning member 30. The first and second positioning members 20, 30 are arranged on the main body 10 and spaced from each other. In the embodiment, the main body 10 is the bottom wall 206 of the bottom case 204. The first and second positioning members 20, 30 perpendicularly extend from the main body 10. The first positioning member 20 is substantially rectangular, and includes a first surface 210 and a second surface 220 connecting with the second surface 220. The first and second surfaces 210, 220 are perpendicular to the main body 10.

The second positioning member 30 is substantially L-shaped, and is arranged at a side of the first positioning member 20. The second positioning member 30 includes a supporting portion 310 and a hook 320. The supporting portion 310 perpendicularly extends from the main body 10 and is substantially perpendicular to the first positioning member 20. When viewed in a direction perpendicular to the second surface 220, the supporting portion 310 and the first positioning member 20 are arranged at opposite sides of the a plane aligning with the first surface 210; when viewed in a direction perpendicular to the first surface 210, the supporting portion 310 and the first positioning member 20 are arranged at opposite sides of the a plane aligning with the second surface 220.

Figure 4:
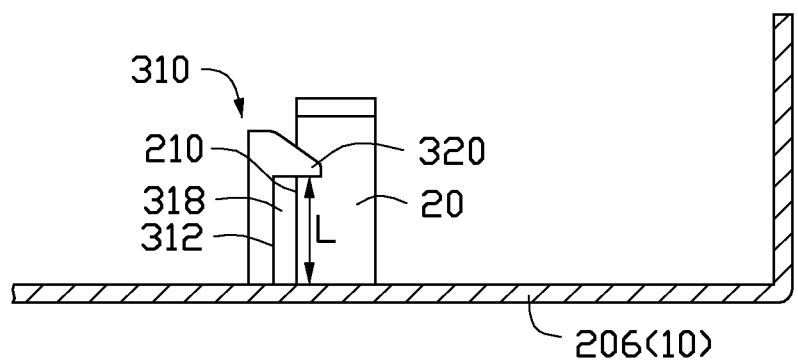
FIG. 4 is a perspective view showing the cable positioning mechanism of FIG. 2 in a second direction perpendicular to the first direction.

The supporting portion 310 includes a first end 312 parallel to the first surface 210 and a second end 314 connecting with the first end 312 and parallel to the second surface 220. Referring also to FIG. 3, the second end 314 is spaced from the second surface 220, and the distance between the second end 314 and the second surface 220 is slightly larger than the diameter of the cable 203, such that a first holding space 316 is formed between the second end 314 and the second surface 220. Further referring to FIG. 4, the first end 312 is spaced from the first surface 210, and the distance between the first end 312 and the first surface 210 is slightly larger than the diameter of the cable 203, such that a second holding space 318 communicating with the first holding space 316 is formed between the first end 312 and the first surface 210.

The hook 320 bents from an end of the supporting portion 310 away from the main body 10. The hook 320 further extend into the second holding space 318, to limit the cable 203 in a first direction perpendicular to the bottom wall 203. In the embodiment, the length of the hook 320 is larger than the distance between the first end 312 and the first surface 210, and the distance L between the hook 320 and the main body 10 is larger than the diameter of the cable 203. In other embodiment, when the cable positioning mechanism 100 is applied to position a plurality of the cables 203, the distance L between the hook 320 and the main body 10 should be larger than the sum of the diameter of the cables 203.

Figure 5:
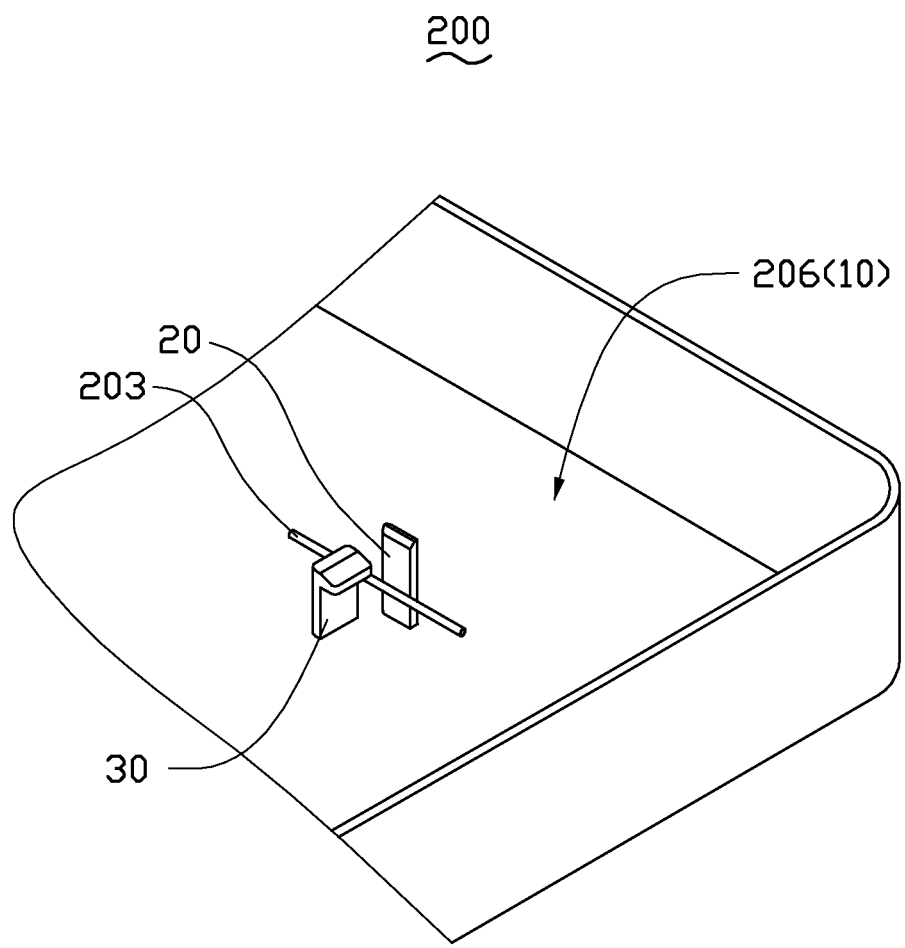
FIG. 5 is a perspective view showing the cable positioning mechanism of FIG. 2 fastening a cable.

Referring to FIGS. 3 and 5, in use, the first holding space 316 receives the cable 203 with the cable 203 parallel to the second surface 220. Then, referring to FIGS. 1 and 4, the cable 203 is rotated to be received in the second holding space 318 with the cable 203 being perpendicular to the second surface 220 and being clamped between the hook 320 and the main body 10. After cable 203 is received in the second holding space 318, the hook 320 cooperates with the main body 10 to limit the cable 203 moving in the first direction. Furthermore, the first surface 210 cooperates with the first end 312 to clamp the cable 203 to prevent the cable 203 from moving in a second direction perpendicular to the supporting portion 310. As a result, the cable 203 is steadily fastened by the cable positioning mechanism 100.

It is to be understood, even though information and advantages of the present embodiments have been set forth in the foregoing description, together with details of the structures and functions of the present embodiments, the disclosure is illustrative only; and that changes may be made in detail, especially in matters of shape, size, and arrangement of parts within the principles of the present embodiments to the full extent indicated by the broad general meaning of the terms in which the appended claims are expressed.

What is claimed is:

1. A cable positioning mechanism for fastening at least one cable, comprising:
   a main body;
   a first positioning member arranged on the main body, the first positioning member comprising a first surface and a second surface connecting with the first surface; and
   a second positioning member arranged on the main body and spaced from the first positioning member, the second positioning member comprising a first end parallel to the first surface and a second end parallel to the second surface; the second end cooperating with the second surface to define a first holding space for allowing the at least one cable being placed thereinto, and the first end cooperating with the first surface to define a second holding space communicating with the first holding space;
   wherein the second positioning member further comprises a supporting portion and a hook protruding from an end of the supporting portion, the hook extends into the second holding space and clamps the at least one cable to the main body when the at least one cable is rotated from the first holding space to the second holding space; wherein the supporting portion and the first positioning member are arranged at opposite sides of a plane aligning with the first surface when viewed in a direction perpendicular to the second surface; and wherein the supporting portion and the first positioning member are arranged at opposite sides of a plane aligning with the second surface when viewed in a direction perpendicular to the first surface.

2. The cable positioning mechanism of claim 1, wherein the distance between the first surface and the first end is greater than the diameter of the at least one cable.

3. The cable positioning mechanism of claim 1, wherein the distance between the hook and the main body is greater than the diameter of the at least one cable.

4. The cable positioning mechanism of claim 1, wherein the distance between the second surface and the second end is greater than the diameter of the at least one cable.

5. An electronic device, comprising:
   a housing; and
   at least one cable positioning mechanism accommodated in the housing, each cable positioning mechanism comprising a main body, a first and second positioning members arranged on the main body, the first positioning member comprising a first surface and a second surface connecting with the first surface, the second positioning member comprising a first end parallel to the first surface and a second end parallel to the second surface, the second end cooperating with the second surface to define a first holding space for allowing the at least one cable being placed thereinto, and the first end cooperating with the first surface to define a second holding space communicating with the first holding space;
   wherein the second positioning member further comprises a supporting portion and a hook protruding from an end of the supporting portion, the hook extends into the second holding space and cooperates with the main body to clamp the at least one cable to the housing when the at least one cable is rotated from the first holding space to the second holding space; wherein the supporting portion and the first positioning member are arranged at opposite sides of a plane aligned with the first surface when viewed in a direction perpendicular to the second surface; wherein the supporting portion and the first positioning member are arranged at opposite sides of a plane aligned with the second surface when viewed in a direction perpendicular to the first surface.

6. The electronic device of claim 5, wherein the distance between the first surface and the first end is greater than the diameter of the at least one cable.

7. The electronic device of claim 5, wherein the distance between the hook and the main body is greater than the diameter of the at least one cable.

8. The electronic device of claim 5, wherein the distance between the second surface and the second end is greater than the diameter of the at least one cable.

* * * * *